United States Patent
Heflin

(10) Patent No.: US 7,508,752 B1
(45) Date of Patent: Mar. 24, 2009

(54) HARDWARE FACILITY SWITCHING IN CROSS-CONNECT SYSTEMS

(75) Inventor: Darrell Heflin, Carrollton, TX (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 10/449,500

(22) Filed: May 30, 2003

(51) Int. Cl.
*H04L 12/28* (2006.01)

(52) U.S. Cl. .................................. 370/217

(58) Field of Classification Search ......... 370/216–228, 370/351, 360, 369, 395.51, 907, 916, 241, 370/242, 244, 248; 379/27.06; 714/27
See application file for complete search history.

(56) References Cited

U.S. PATENT DOCUMENTS

| | | | | |
|---|---|---|---|---|
| 5,930,334 A * | 7/1999 | Lundberg et al. | ........ | 379/27.06 |
| 6,081,503 A | 6/2000 | Bordogna et al. | .......... | 370/222 |
| 6,137,790 A | 10/2000 | Bordogna et al. | .......... | 370/351 |
| 6,301,228 B1 | 10/2001 | Bordogna et al. | .......... | 370/244 |
| 6,717,909 B2 * | 4/2004 | Leroux et al. | ............... | 370/228 |
| 6,798,740 B1 * | 9/2004 | Senevirathne et al. | ....... | 370/219 |
| 6,834,049 B1 * | 12/2004 | Tomar et al. | ................ | 370/369 |
| 6,904,542 B2 * | 6/2005 | Ryhorchuk et al. | ........... | 714/27 |
| 7,016,379 B2 * | 3/2006 | Falkenstein et al. | ......... | 370/535 |
| 7,126,921 B2 * | 10/2006 | Mark et al. | .................. | 370/242 |
| 7,149,821 B2 * | 12/2006 | Brice et al. | .................... | 710/8 |
| 2002/0039360 A1 * | 4/2002 | Mazzurco et al. | .......... | 370/360 |
| 2004/0062228 A1 * | 4/2004 | Wu | ........................... | 370/351 |
| 2004/0085895 A1 * | 5/2004 | Zettinger et al. | ........... | 370/220 |
| 2004/0196838 A1 * | 10/2004 | Zadikian et al. | ............ | 370/360 |
| 2005/0232269 A1 * | 10/2005 | Yao et al. | .................... | 370/389 |

* cited by examiner

*Primary Examiner*—Dmitry Levitan
(74) *Attorney, Agent, or Firm*—Cindy Kaplan

(57) ABSTRACT

Techniques for switching facilities in cross-connect systems are provided. Redundant line cards can determine line card path status and insert the path status into the associated data stream. A switch matrix can analyze the path status of the redundant line cards in hardware and switch the selected line card based on which line is providing the best performance. Additionally, consecutive path status information can be analyzed before switching line cards.

21 Claims, 6 Drawing Sheets

HARDWARE FACILITY SWITCHING IN CROSS-CONNECT SYSTEMS

BACKGROUND OF THE INVENTION

The present invention relates to switching facilities in network devices. More specifically, the invention relates to hardware switching of facilities in Synchronous Optical Network (SONET) cross-connect switches.

Redundant systems are a common mechanism for increasing the reliability of computer systems, network devices and networks. For example, in SONET cross-connect switches, 1-for-1 protection is often provided for incoming network facilities (or line cards). The redundant facilities are referred to as "working" and "protect" pairs. When a failure of performance degradation occurs on the working facility, the SONET specification states that the system should restore downstream traffic by switching to the protect facility within 50 msec of fault detection.

Current SONET implementations exist where software detects facility failures and restores the path by switching the output to the protect facility. Typically, there are software routines that monitor the facility path status, decide when to switch and perform the switch.

However, the software that monitors facility path status and effects a switch are executing on different system modules. Therefore, several inter-processor exchanges may be required before restoration of down-stream traffic occurs. This can place a difficult real-time burden on the software to meet the 50 msec constraint. Also, additional burdens may be present if the system is large and/or there are many simultaneous faults arriving at the system.

It would be beneficial to have new technologies that allow facility switching to occur rapidly (e.g., in 50 msec) even in the presence of many simultaneous network failures. Additionally, it would be beneficial if system software for facility switching is simplified and the bandwidth of inter-processor communications is reduced.

SUMMARY OF THE INVENTION

The present invention provides innovative techniques for switching facilities in network devices or systems. In general, each redundant facility determines the path status of the facility or line card. The facilities then send their path status to a switch matrix (e.g., by inserting the path status in the associated data stream). The switch matrix processes the path status from the facilities over time and can switch the facility that is currently being utilized. Advantages can include that switching can be performed quickly regardless of the number of failures. Additionally, system software for facility switching can be simplified and the bandwidth of inter-processor communication can be reduced. Some specification embodiments of the invention are described below.

In one embodiment, the invention provides a method for switching line cards in a network device. A first line card stores path status information in a data stream from the first line card. A second line card stores path status information in a data stream from the second line card. A switch matrix receives the data streams from the first and second line cards. The switch matrix outputs the data stream from one of the first or second line cards depending on the path status information in the data streams from the first and second line cards and previously received path status information in the data streams from the first and second line cards. In one embodiment, the network device is a SONET cross-connect switch.

In another embodiment, the invention provides a method for switching line cards in a network device. Each line card determines path status of the path associated with the line card. Each line card inserts the path status in an associated data stream. A switch matrix examines the path status in each data stream in order to select the path with the best path status and outputs the data stream of the selected path. A switch enable control is disabled if the selected path is different than a previously selected path, where the switch does not change the selected path while the switch enable control is disabled. In one embodiment, the switch matrix examines consecutive occurrences of path status information in the data streams before selecting a better path.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments in network devices that switch facilities according to path status information in the data streams. However, embodiments of the invention are not limited to any particular environment, protocol, application, or implementation. For example, although SONET cross-connect switches will be described as a representative network device for embodiments of the invention, the invention advantageously applied to other network devices or computer systems. Therefore, the description of the embodiments that follows is for purposes of illustration and not limitation.

Figure 1:
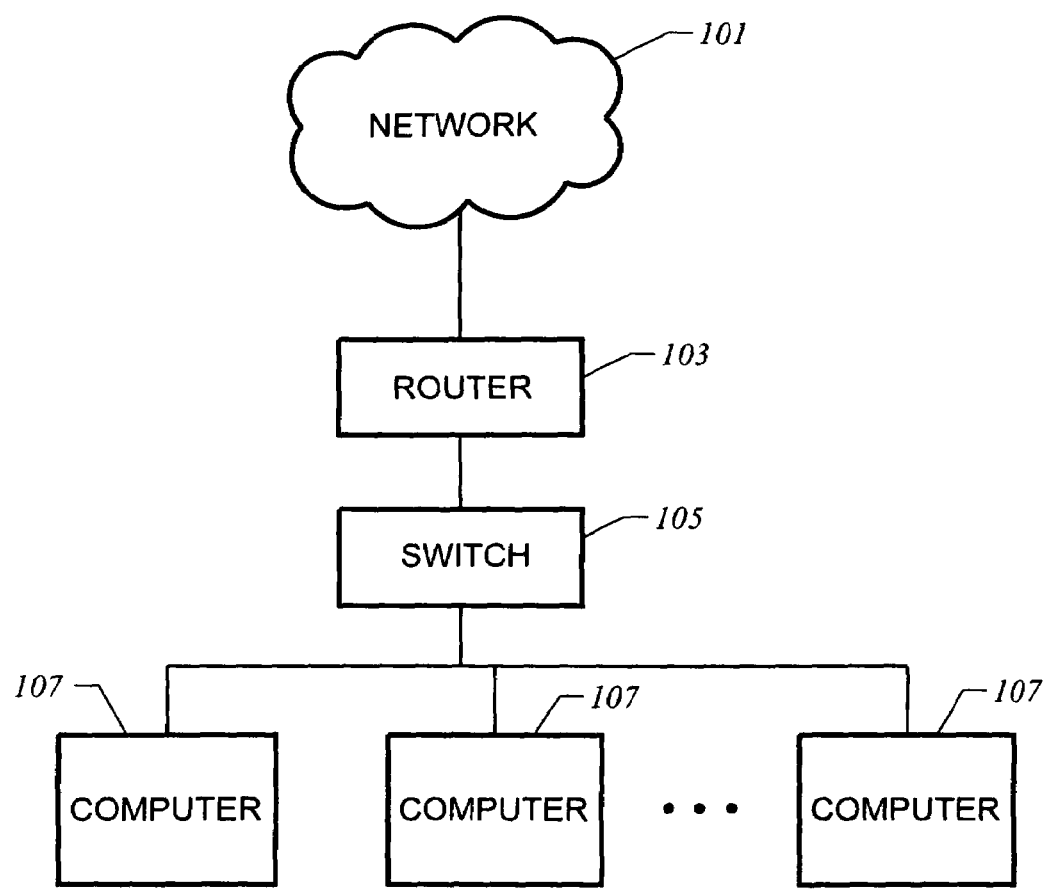
FIG. 1 shows an example of a network and network components.

FIG. 1 shows a block diagram of a network environment. A network 101 is shown in communication with a router 103. Network 101 can be a local area network (LAN) or wide area network (WAN), such as the Internet. Although shown as a cloud, network 101 typically includes multiple network devices and computer systems, some of which are shown in FIG. 1.

Router 103 provides communication between networks. A switch 105 is connected to router 103 and joins communication lines from computers 107. The routers and switch that may be present in network 101 can operate at significantly higher bandwidths (e.g., optical channels), but the functionality is similar.

Although a router and switch are shown in FIG. 1, these are meant to illustrate examples of network devices that can exist in a network. There are many other network devices that can be found in networks and the functionality of multiple network devices can also be combined into a single network device. Therefore, the invention is not limited to any specific network device or configuration.

Figure 2:
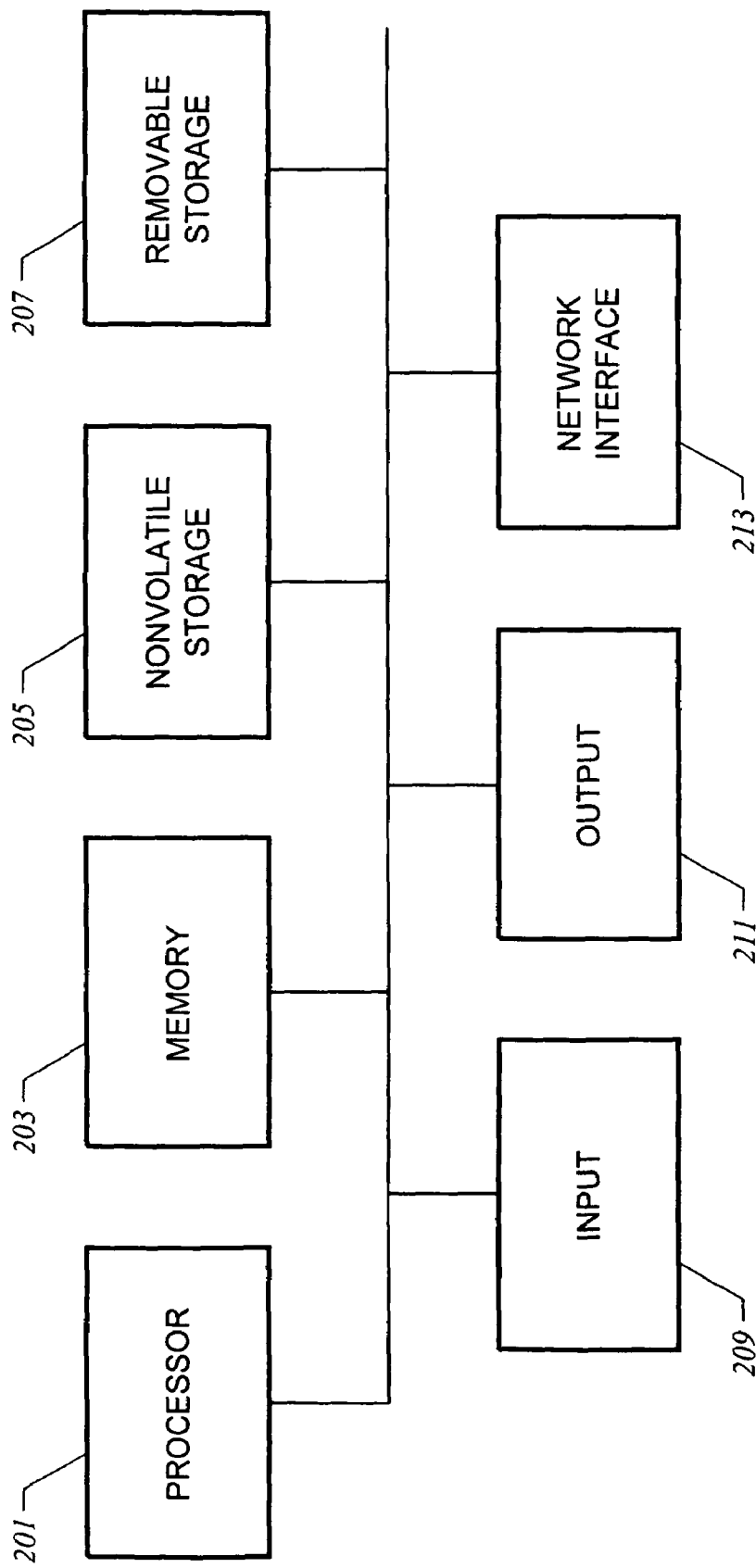
FIG. 2 illustrates a block diagram of a computer system, network device or subsystems thereof that can utilize embodiments of the invention.

FIG. 2 shows a block diagram of components that can be present in network devices and computer systems that implement embodiments of the invention. A processor 201 executes instructions from computer programs (including operating systems). Although processors typically have memory caches, processor 201 utilizes memory 203, which can store instructions or computer code and data.

A non-volatile storage 205 can store computer programs and data such that it is typically persistent and provides more storage when compared to memory 203. At present, a common non-volatile storage is one or more hard drives. A removable storage 207 provides mobility to computer programs and/or data that are stored thereon. Examples of removable storage are floppy disks, tape, CD/ROM, flash memory devices, and the like.

Memory 203, non-volatile storage 205 and removable storage 207 provide examples of computer readable storage media that can be utilized to store and retrieve computer programs incorporating computer codes that implement the invention, data for use with the invention, and the like. Additionally, a data signal embodied in a carrier wave (e.g., in a network including the Internet) can be the computer readable storage medium. An input 209 allows a user to interface with the system. Input can be done through the use of a keyboard, a mouse, buttons, dials, or any other input mechanism. An output 211 allows the system to provide output to the user. Output can be provided through a monitor, display screen, LEDs, printer or any other output mechanism.

A network interface 213 allows the system to interface with a network to which it is connected. The components shown in FIG. 2 can be found in many network devices and computer systems. However, components can be added, deleted and combined so FIG. 2 is for illustration purposes. Additionally, these components can also be present on subsystems (e.g., cards) in network devices and computer systems.

Figure 3:
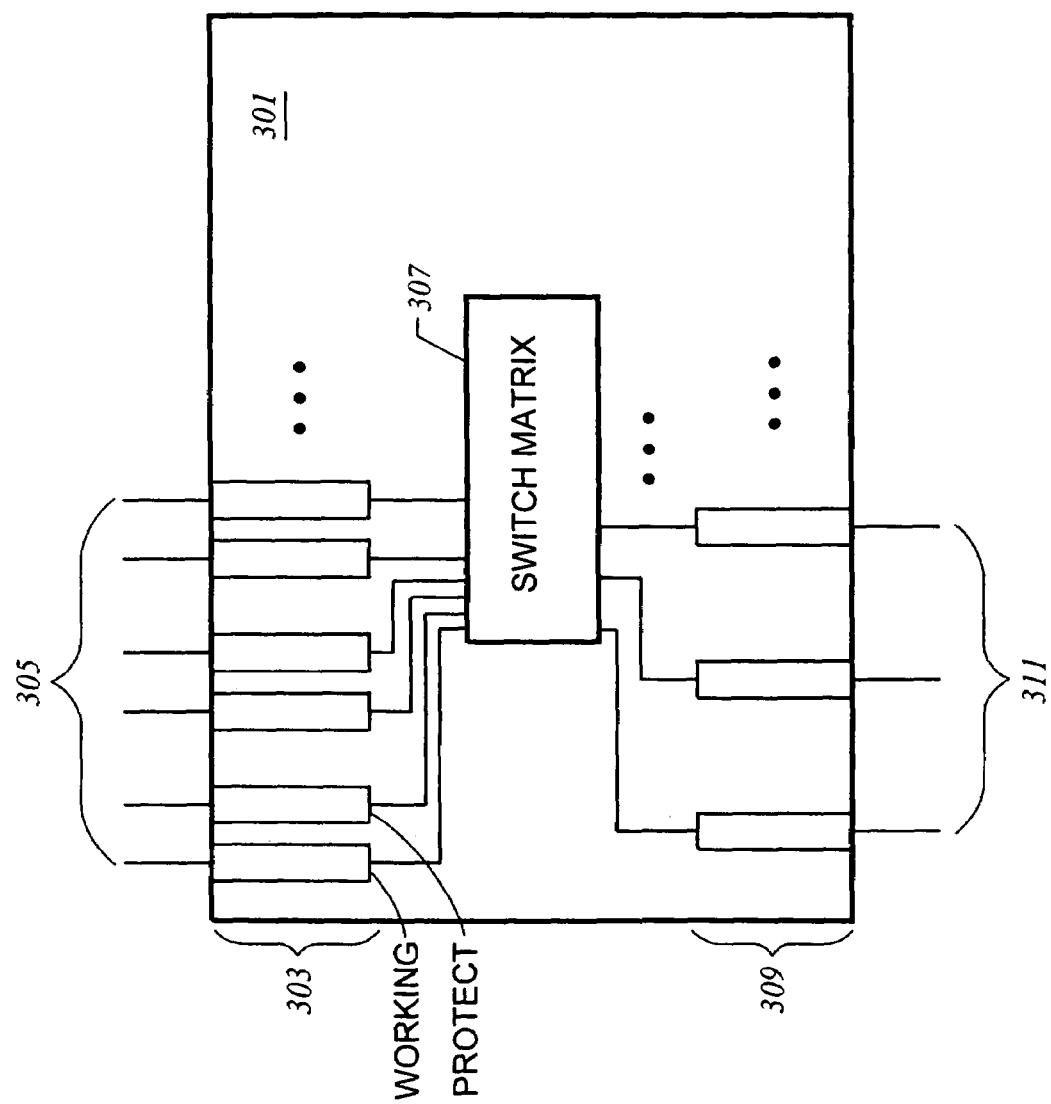
FIG. 3 shows a block diagram of a cross-connect switch that includes redundant line cards.

FIG. 3 shows a block diagram of a SONET cross-connect switch. A cross-connect switch 301 includes slots in which multiple line cards 303 can be inserted to receive data streams over optical cables 305. Redundant facilities can be provided for fault protection of line cards 303. The redundant facilities are typically referred to as "working" and "protect" pairs.

For purposes of illustration, two of the line cards 303 have been labeled as a working and protect pair. It should be understood that the working and protect pairs can be at various slots in cross-connect switch 301. Additionally, although the invention is described in reference to redundant pairs, the invention can be advantageously applied to any number of redundant facilities.

A backplane (not shown) connects lines cards 303 to switch matrix 307. Switch matrix 307, among other things, determines which data stream from a working and protect pair should be output to line cards 309. Line cards 309 send the selected data streams on optical cables 311.

With one embodiment of the invention, the software that resides on each redundant facility determines the path status of the facility. For example, the path status can be a 4 bit value that is a graded level of performance for the facility. This path status value is stored in a 4 bit unused time slot in the internal connection to the switch matrix.

When a line card transmits data to switch matrix 307, the value stored in the path status can be inserted in overhead bytes of the data stream (e.g., the Z2 byte). For example, with 4 bits, zero could indicate the best performance and 15 the worst (with a sliding scale between). In this manner, software on each facility monitors the path status and simply stores the path status in a register, which is then inserted into the data stream. This reduces inter-process communication between line cards 305 and switch matrix 307.

Hardware on switch matrix 307 extracts the path status from each of the data streams from the redundant facilities. The hardware then analyzes the performance of the facilities indicated by the associated path status and makes a determination which data stream should be output down stream (i.e., the data stream with the best path status). Switch matrix 307 retrieves stored path status of the data streams and using the previous and current path status information, determines the data stream with the best path status. If the path status from an unselected facility is better than the selected facility, then a hardware switch is performed to toggle which facility is selected. Although hardware is utilized in some embodiments, other embodiments can use software.

Figure 6:
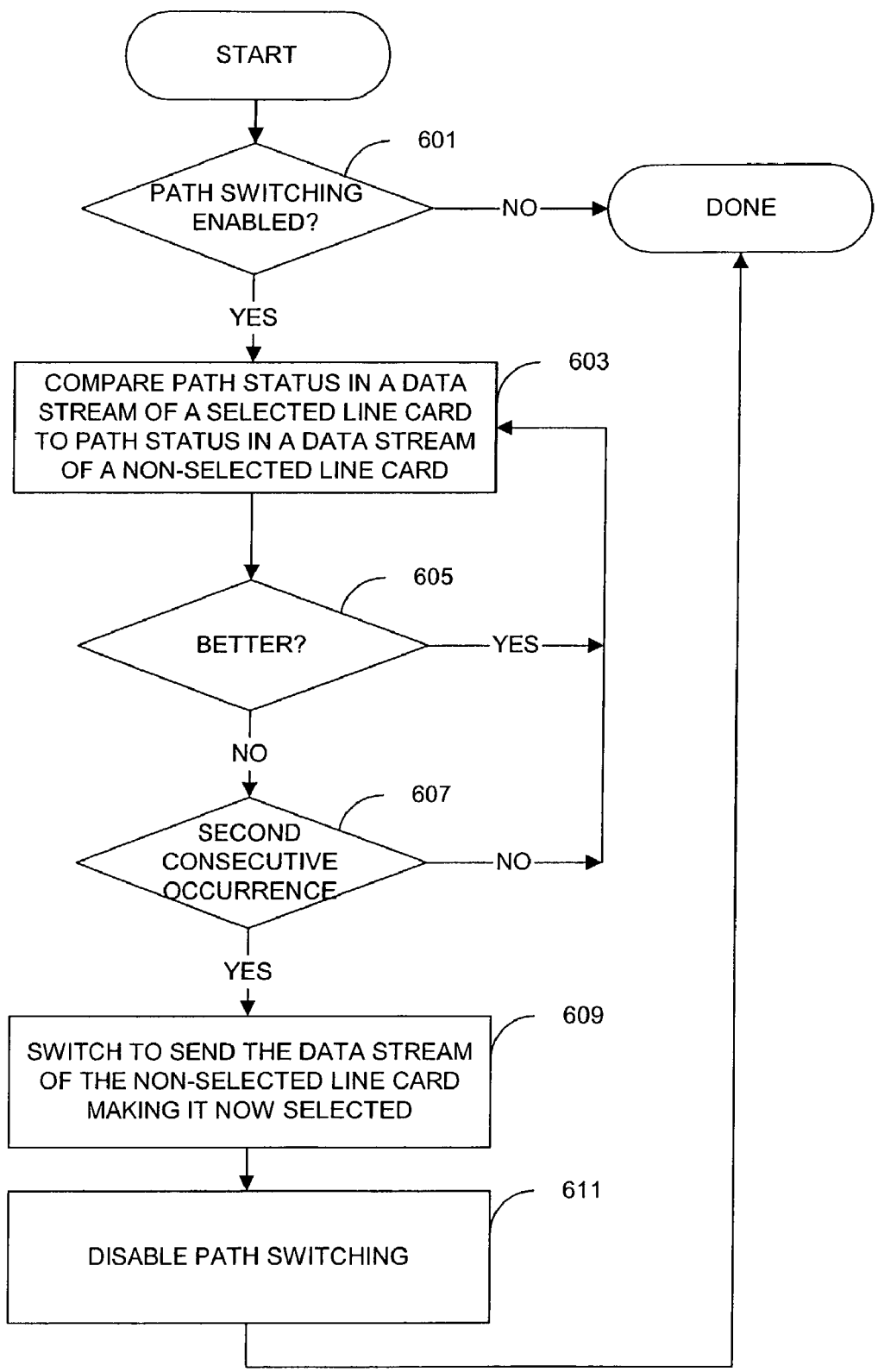
FIG. 6 shows a flowchart of a process of determining when to switch line cards according to the path status.

As will be described in more detail in reference to FIG. 6, a path select control (or bit) can be utilized to specify which redundant facility is selected and a path switching enable control (or bit) can be utilized to indicate whether hardware switching is enabled. If hardware switching is enabled and a hardware switch is performed, the path switching enable control can be reset (or disabled) so that further hardware switches are disabled until re-armed by software. This can be helpful if it is undesirable to repeatedly perform hardware switches without further analysis. Additionally, in some embodiments, a hardware switch may only be enabled if consecutive path status information indicates that a switch would be beneficial.

Figure 4:
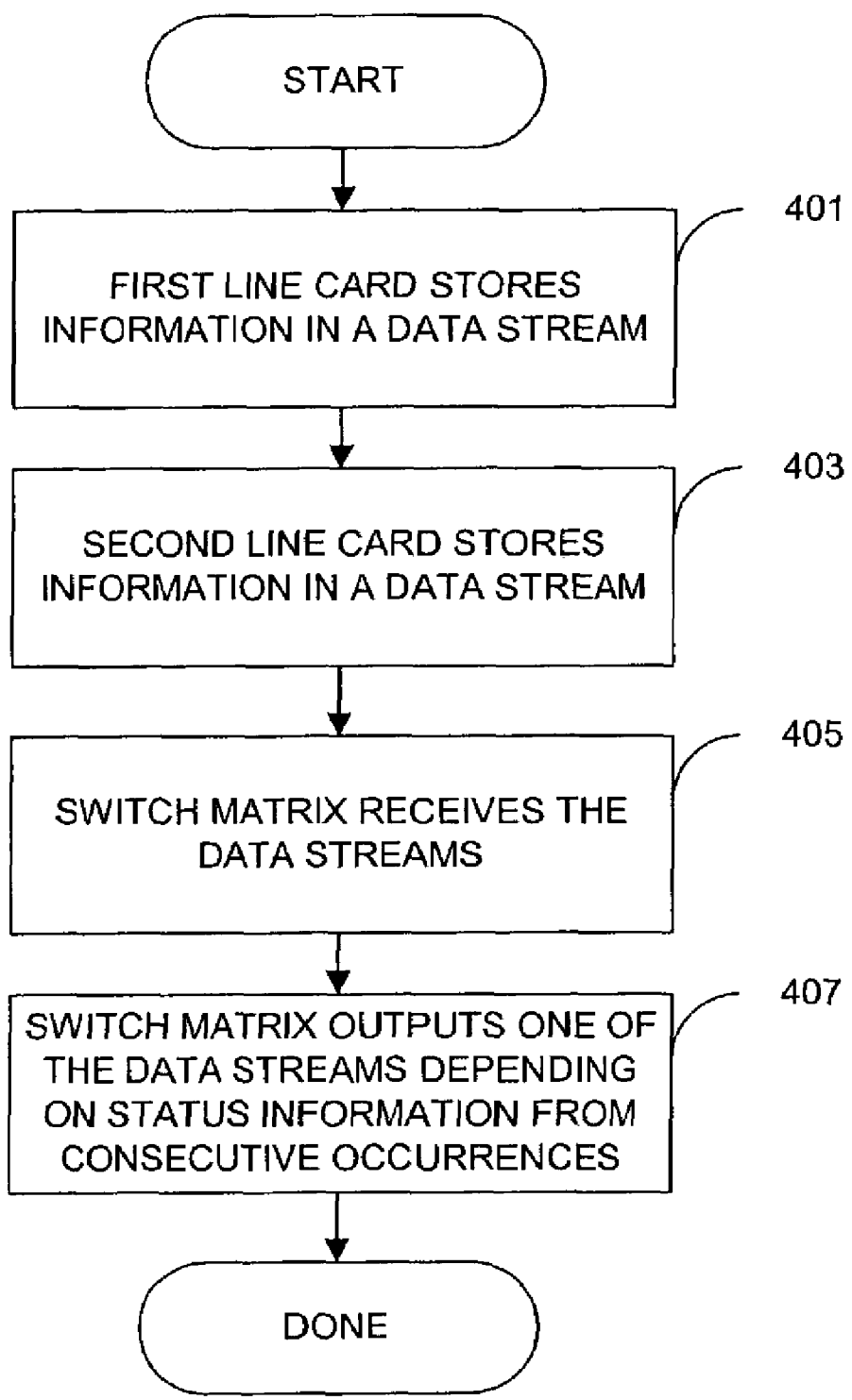
FIG. 4 shows a flowchart of a process of switching line cards in a network device.

Now that representative hardware of a cross-connect switch has been described, it may be beneficial to go over the flow of one embodiment of the invention. FIG. 4 shows a flowchart of the process of switching line cards in a network device. As with as all the flowcharts shown herein, steps can be added, deleted, combined, and reordered without departing from the spirit and scope of the invention.

At a step 401, a first line card stores path information in a data stream. For example, software on the first line card can determine path status information and store that status in a register. The contents of the register can then be inserted in overhead bytes in the data stream.

At a step 403, a second line card stores path status information in a data stream. The second line card can operate in a similar fashion to the first line card. Although a register has been described, other embodiments can utilize software to store the path status information directly in the data stream.

A switch matrix receives the data streams from the first and second line cards at step 405. Hardware on the switch matrix analyzes the path status information that is stored in the data streams and path status information that was previously received in the data streams to determine which data stream exhibits the best performance. At a step 407, the switch matrix selects one of the data streams depending on the path status information from consecutive occurrences in order to filter bit errors that may cause false switches. Thus, the switch matrix bases its selection on the path status information in the current data streams and the information from the previously received path status information in the data streams.

Figure 5:
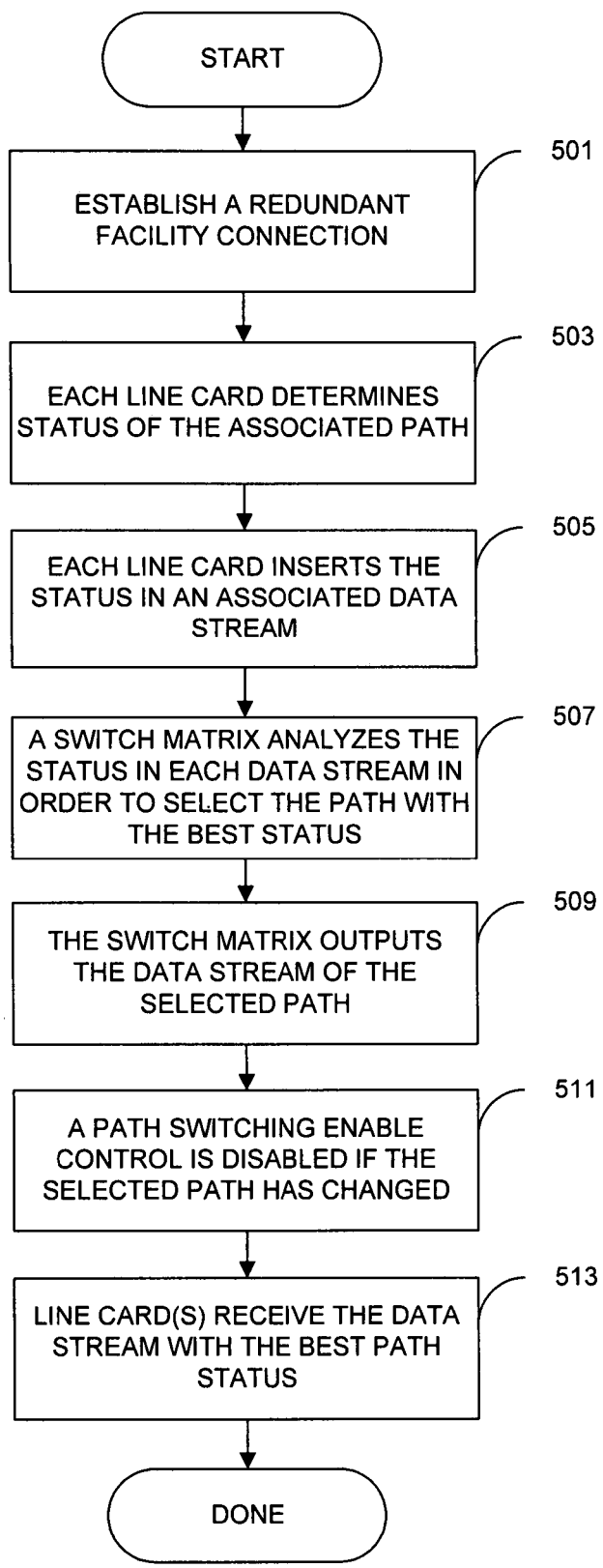
FIG. 5 shows a flowchart of another process of switching line cards in a network device.

FIG. 5 shows a flowchart of another process of switching line cards in a network device. At a step 501, a redundant facility connection is established. For example, the redundant facility connection can utilize working and protect pairs of line cards.

Each line card determines the status of the associated path at a step 503. At a step 505, each line card inserts the path status in an associated data stream. In order words, each line card inserts the path status of the line card in the data stream associated with that line card.

At a step 507, a switch matrix examines the path status in each data stream in order to select the path with the best status. The switch matrix outputs the data stream of the selected path at a step 509. At a step 511, a path switching enable control is disabled if the selected path has changed. If the selected path is different than a previously selected path (e.g., specified by a path select control), the path switching enable control is disabled so that the switch matrix does not change the selected path again until the path switching enable control is enabled (e.g., by software).

One or more line cards receive the data stream with the best path status at a step 513. The line cards then send the data streams as output.

The above flowcharts have described the general flow of embodiments of the invention. FIG. 6 shows a flowchart of a process of determining when to switch facilities, which can be implemented in hardware, software or a combination of both. At a step 601, it is determined if path switching is enabled. A path switching enable control can be utilized to indicate whether switching of facilities is enabled. This path switching enable control can be set (or reset) by software when it is determined that path switching should be enabled.

If path switching is enabled, the path status in a data stream of a selected line card (e.g., the line card that is currently being utilized to supply the downstream data) is compared to the path status in a data stream of a non-selected line card at a step 603.

At a step 605, it is determined whether the path status from the selected line card is better than the path status from the non-selected line card. If the path status of the selected line card is not better than the non-selected line card, at a step 607 it can be determined if this is the second consecutive occurrence where the path status of the selected line card is not better than the path status of the non-selected line card. For example, path status previously received from the line cards can be stored and analyzed. In other embodiments, current and previously received path status information is analyzed to determine the path with the best status. Although two consecutive occurrences are shown, other embodiments can advantageously use more consecutive occurrences of path status comparisons or other techniques for analyzing current and past path status information.

If this is the second consecutive time that the path status of the selected line card is not better than the path status of the non-selected line card, a switch is performed to send the data stream of the non-selected line card making it now the selected line card (and vice versa for the selected line card) at a step 609. For example, hardware can change the path select control to indicate which line card is selected.

After the line cards have been switched, path switching can be disabled at a step 611. For example, the path switching enable control that was checked at a step 601 can be toggled to disable path switching. Although a bit to disable path switching is not required, it can be beneficial to utilize this so that repeated occurrences of hardware switching of line cards does not occur until software has analyzed the conditions associated with the switches.

With embodiments of the invention, a 50 msec facility switch can be accomplished regardless of the number of simultaneous network failures. Additionally, system software for facility switching is simplified and the bandwidth for inter-processor communication is reduced.

While the above is a complete description of preferred embodiments of the invention, various alternatives, modifications, and equivalents can be used. It should be evident that the invention is equally applicable by making appropriate modifications to the embodiments described above. For example, although the invention has been described in relation to SONET cross-connect switches, the invention can be advantageously implied to other network devices. Therefore, the above description should not be taken as limiting the scope of the invention as defined by the metes and bounds of the appended claims along with their full scope of equivalents.

What is claimed is:

1. A method for switching line cards in a network device, comprising:
   a first line card storing path status information in a data stream from the first line card;
   a second line card storing path status information in a data stream from the second line card;
   a switch matrix receiving the data streams from the first and second line cards, analyzing the path status information and previously received path status information in the data streams from both the first and second line cards, and identifying the data stream with a best path status;
   selecting one of the data streams from the first and second line cards based on the path status information in the data streams from the first and second line cards and previously received path status information in the data streams from the first and second line cards;
   wherein the data stream with the best path status is selected only if the data stream has had the best path status in two or more consecutive path status information in the data stream;
   determining if the selected data stream is different than a previously selected data stream;
   if the selected data stream is different than a previously selected data stream, switching to said selected data stream only if a switch control is set to enabled, wherein said switch control indicates whether switching between said first and second active line cards is permitted; and
   outputting the selected data stream from the switch matrix.

2. The method of claim 1, wherein the switch matrix analyzing the path status information is performed by hardware.

3. The method of claim 1, further comprising the first and second line cards storing the path status information in registers.

4. The method of claim 1, wherein the path status information is stored in overhead of the data streams.

5. The method of claim 1, wherein the first and second line card storing the path status information is performed by software.

6. The method of claim 1, wherein the network device is a Synchronous Optical Network (SONET) cross-connect switch.

7. The method of claim 1 wherein storing path status information comprises storing path status information for previously selected data streams.

8. The method of claim 1 wherein switching is performed by hardware and the switch control is set by software.

9. The method of claim 8 further comprising enabling a disabled switch control utilizing software.

10. The method of claim 1 further comprising disabling said switch control after switching to said selected data stream if the selected data stream is different than the previously selected data stream.

11. An apparatus that switches line cards, comprising:
   a first line card that stores path status information in a data stream from the first line card;

a second line card that stores path status information in a data stream from the second line card; and a switch matrix that receives the data streams from the first and second line cards, analyzes the path status information and previously received path status information in the data streams from both the first and second line cards, identifies the data stream with the best path status, and selects one of the data streams from the first and second line cards based on the path status information in the data streams from the first and second line cards and previously received path status information in the data streams from the first and second line cards, determines if the selected data stream is different than a previously selected data stream, and outputs the selected data stream;

wherein the data stream with the best path status is selected only if the data stream has had the best path status in two or more consecutive path status information in the data stream and switching between data streams is performed only if said switch control is set to enabled, wherein said switch control indicates whether switching between the first and second active line cards is enabled.

12. An apparatus that switches line cards, comprising:

a first line card that stores path status information in a data stream from the first line card;

a second line card that stores path status information in a data stream from the second line card; and a means for switching that receives the data streams from the first and second line cards, analyzes the path status information and previously received path status information in the data streams from both the first and second line cards, identifies the data stream with the best path status, and selects one of the data streams from the first and second line cards based on the path status information in the data streams from the first and second line cards and previously received path status information in the data streams from the first and second line cards, determines if the selected data stream is different than a previously selected data stream, and outputs the selected data stream;

wherein the data stream with the best path status is selected only if the data stream has had the best path status in two or more consecutive path status information in the data stream and switching between data streams is performed only if said switch control is set to enabled, wherein said switch control indicates whether switching between the first and second active line cards is enabled.

13. A method for switching line cards in a network device, comprising:

each line card determining path status of an associated path;

each line card inserting the path status in an associated data stream;

a switch matrix examining the path status in each data stream and previously received path status information in order to select a path with a best path status, selects one of the paths based on the path status information in the data streams and previously received path status information, and outputting the data stream of the selected path; and disabling a switch enable control if the selected path is different than a previously selected path, wherein the switch matrix does not change the selected path while the switch enable control is disabled and wherein the switch enable control indicates whether switching between said first and second active line cards is enabled.

14. The method of claim 13, further comprising a path select value that specifies the previously selected path.

15. The method of claim 13, further comprising the switch matrix examining the path status in each data stream if the switch enable control is enabled.

16. The method of claim 13, wherein enabling the switch enable control is performed by software.

17. The method of claim 13, wherein disabling the switch enable control is performed by hardware.

18. The method of claim 13, further comprising establishing a redundant facility connection for the line cards.

19. The method of claim 13, wherein the network device is a Synchronous Optical Network (SONET) cross-connect switch.

20. An apparatus that switches line cards, comprising:

a plurality of lines cards that determine a path status of an associated path and insert the path status in an associated data stream;

a switch matrix that examines the path status in each data stream and previously received path status information in order to select a path with a best path status, selects one of the paths based on the path status information in the data streams and previously received path status information, and outputs the data stream of the selected path; and a switch enable control that is disabled if the selected path is different than a previously selected path, wherein the switch matrix does not change the selected path while the switch enable control is disabled and wherein the switch enable control indicates whether switching between said first and second active line cards is enabled.

21. An apparatus that switches line cards, comprising:

a plurality of lines cards that determine a path status of an associated path and insert the path status in an associated data stream;

a means for switching that examines the path status in each data stream and previously received path status information in order to select a path with a best path status, selects one of the paths based on the path status information in the data streams and previously received path status information, and outputs the data stream of the selected path; and a switch enable control that is disabled if the selected path is different than a previously selected path, wherein the means for switching does not change the selected path while the switch enable control is disabled and wherein the switch enable control indicates whether switching between said first and second active line cards is enabled.

* * * * *